(12) United States Patent
Meganathan et al.

(10) Patent No.: US 10,083,584 B2
(45) Date of Patent: Sep. 25, 2018

(54) VIDEO SURVEILLANCE SYSTEM WITH SELECTABLE OPERATING SCENARIOS AND SYSTEM TRAINING FOR IMPROVED SITUATIONAL AWARENESS

(71) Applicant: Honeywell International Inc., Morristown, NJ (US)

(72) Inventors: Deepak Sundar Meganathan, Bangalore (IN); Sivasanthanam Dhayalan, Thiruvannamalai (IN); Damodharan Mohanam, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 239 days.

(21) Appl. No.: 14/983,711

(22) Filed: Dec. 30, 2015

(65) Prior Publication Data

US 2017/0193774 A1 Jul. 6, 2017

(51) Int. Cl.
*G08B 13/196* (2006.01)
*H04N 7/18* (2006.01)
*G08B 25/14* (2006.01)

(52) U.S. Cl.
CPC . *G08B 13/19693* (2013.01); *G08B 13/19645* (2013.01); *G08B 13/19669* (2013.01); *G08B 13/19684* (2013.01); *H04N 7/181* (2013.01); *H04N 7/188* (2013.01); *G08B 25/14* (2013.01)

(58) Field of Classification Search
CPC ........ G08B 13/19693; G08B 13/19645; G08B 13/19669; G08B 13/19684; H04N 7/181; H04N 7/188
See application file for complete search history.

(56) References Cited

U.S. PATENT DOCUMENTS 6,970,183 B1 * 11/2005 Monroe ................ G08B 7/062
348/143
2005/0132414 A1 6/2005 Bentley et al.
2006/0171453 A1 * 8/2006 Rohlfing .......... G08B 13/19632
375/240.01

(Continued)

OTHER PUBLICATIONS

Axxon Intellect Enterprise solutions for your organization—Vertical Solutions, http://www.axxonsoft.com/verticals/—Copyright 2003-2015.

(Continued)

*Primary Examiner* — Christopher Findley
(74) *Attorney, Agent, or Firm* — Husch Blackwell LLP

(57) ABSTRACT

A system including a plurality of cameras of a surveillance system that detect threats within a secured geographic area, a first file embodied in memory that defines a plurality of human use scenarios of the secured area, one of the plurality of human user scenarios being selected by a human user, a respective second file corresponding to each of the plurality of human user scenarios embodied in memory that defines critical surveillance areas of the secured area based upon the selected scenario and at least upon a time of day, the second file receiving from the user an identifier of one or more of the plurality of cameras that correspond to each of the critical surveillance areas and processor of the surveillance system that preferentially displays video from each of the critical surveillance areas based upon the time of day and camera identifiers received from the user.

18 Claims, 8 Drawing Sheets

(56) References Cited

U.S. PATENT DOCUMENTS

| | | | |
|---|---|---|---|
| 2011/0128382 A1* | 6/2011 | Pennington | G07F 17/32 |
| | | | 348/153 |
| 2013/0254740 A1* | 9/2013 | Swaminathan | G06F 8/20 |
| | | | 717/105 |
| 2015/0296187 A1 | 10/2015 | Baldwin | |
| 2015/0296188 A1 | 10/2015 | Meganathan et al. | |
| 2016/0094805 A1* | 3/2016 | Wang | H04N 7/181 |
| | | | 725/93 |

OTHER PUBLICATIONS

Milestone—The open platform company—Airport surveillance solutions—High security for high performance http://www.milestonesys.com/Sharepoint/Verticals/Airport/Airport_verticalflyer-ENG_web.pdf, Airport Verticle brochure—Oct. 14, 2014.

Extended European search report from corresponding EP patent application 16202551.4, dated May 17, 2017.

\* cited by examiner

VIDEO SURVEILLANCE SYSTEM WITH SELECTABLE OPERATING SCENARIOS AND SYSTEM TRAINING FOR IMPROVED SITUATIONAL AWARENESS

FIELD

This application relates to security systems and more particular to surveillance systems.

BACKGROUND

Systems are known to protect people and assets within secured areas. Such systems are typically based upon the use of one more sensors and/or cameras that are used to detect threats within the areas.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors and/or cameras may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may alert the user and display video from a camera near the sensor. The control panel may also send a signal to a central monitoring station.

While conventional security systems work well, it is sometimes difficult or inconvenient to always monitor the most active areas. Accordingly, a need exists for better methods and apparatus for displaying video of areas most in need of surveillance.

BRIEF DESCRIPTION OF THE DRAWINGS

FIG. 2a;

DETAILED DESCRIPTION

Figure 1:
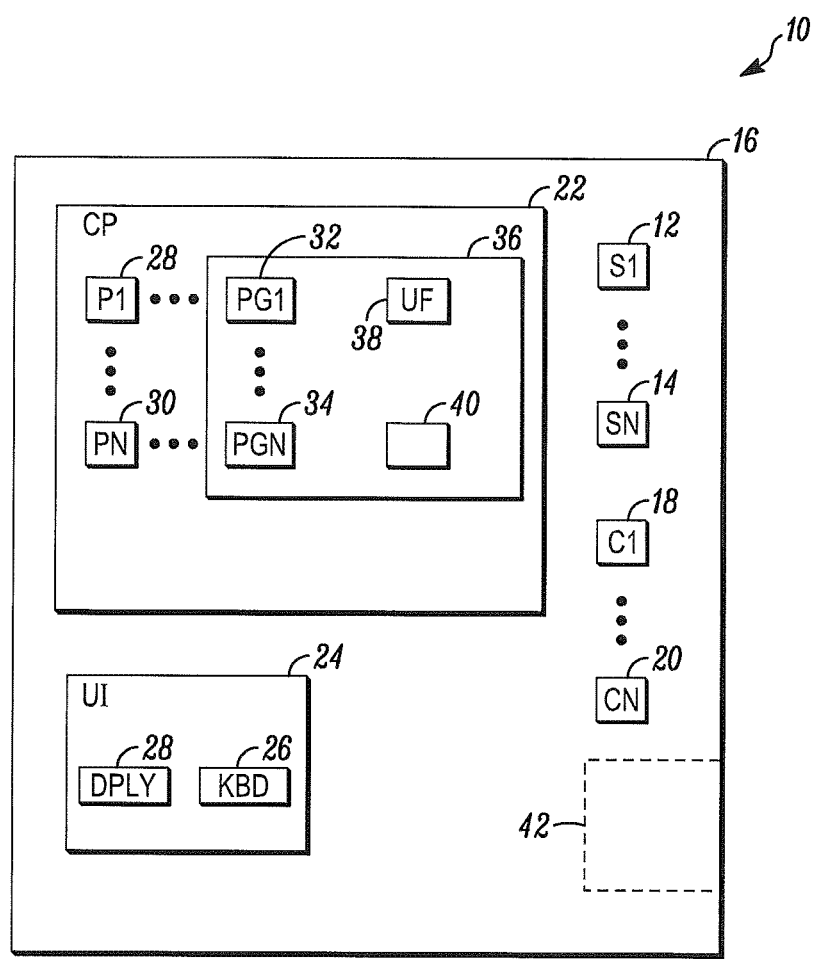
FIG. 1 illustrates a block diagram of a surveillance system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a simplified block diagram of a surveillance system 10 shown generally in accordance with an illustrated embodiment. Included within the system is a number of sensors 12, 14 and closed circuit television (CCTV) cameras 18, 20 that detect threats within a secured geographic area 16.

The sensors may be embodied in any of a number of different forms. For example, at least some of the sensors may be switches placed on the doors and/or windows providing entrance into and egress from the secured area. Other sensors may be embodied as passive infrared (PIR) sensors placed within the interior of the secured area and used to detect intruders when the area is otherwise unoccupied. Still other sensors may be environmental detectors (e.g., smoke, carbon monoxide, etc.).

Also included within the system may be a control pane 221, either located within the secured area as shown in FIG. 1 or located remotely. The control panel may monitor the sensors for threats. Upon detecting a threat, the control panel may activate a local audible or visual alarm device.

The system may be monitored and controlled via a user interface 24. Individual door alarms, zones or even the entire system may be armed and disarmed via instructions entered through a keyboard 26. Status information including identifiers of any activated sensors may be depicted on a display 28.

Included within each of the sensor and cameras, the control panel and the user interface may be one or more processor apparatus (processors) 28, 30, each operating under control of one or more computer programs 32, 34 loaded from a non-transitory computer readable medium (memory) 36. As used herein, reference to a step performed by a computer program is also reference to the processor that executed that step.

For example, one or more alarm processors may monitor armed sensors located on doors and/or windows and provide an indication of activation on the display. Other processors may receive video from the cameras and route the video accordingly. Under one embodiment, an icon corresponding to each of the cameras may be depicted on the display. Upon activation of one of the icons, video from the corresponding camera may be shown on the display.

Other icons on the display may be used to activate salvo views. In this regard, a salvo view may include video from a number of cameras shown within a single window on the display. In this regard, the video of a salvo view may be from cameras with respective fields of view that cover the same area. Other salvo views may display video from cameras serving a common function (e.g., monitoring entrances/exits, etc.).

In order to monitor a facility (i.e., all or a portion of the secured area), a human user (e.g., a guard) may select one or more cameras and/or salvo views in any combination. The user may move the windows displaying video into convenient locations on the screen and expand/reduce window sizes to incorporate the video combination into a limited screen size.

In general, the video from cameras that are more important (e.g., they cover areas of higher risk) may be given a larger size and may occupy a center portion of the screen.

Less important video may be adjusted to a smaller size and placed along a periphery of the screen around the central area.

During the normal course of a day, week or month, the relative monitoring priorities of individual geographic locations within the secured area may change. For example, in the case of a school, it may be critical to monitor a front entrance where school buses discharge students in the morning and where buses are loaded in the evening. Similarly, it may be critical to monitor a lunch room during the lunch hour. After school hours, it may be critical to monitor doors along a periphery of the school in order to detect intruders.

In the case of a hospital, it may be critical to monitor an emergency room upon the arrival of ambulances and/or any motor vehicle. Similarly, it may be critical to monitor a visitor's entrance during visiting hours.

In general, critical areas 42 may be defined in advance of commissioning of the surveillance system based upon the intended human use factors (use factors) of the secured area. In this case, a human use factor refers to the predominant use the secured area by humans (e.g., a school, a hospital, etc.).

Under one illustrated embodiment, a number of possible human use factors may be defined and saved in a file 38. When the system is commissioned, the possible uses of the secured area are presented in a list on the display and the user selects one of the uses that most closely applies to the use of the secured area. Once selected, a list of critical areas related to the selected use factor are retrieved from a second file 40 and presented to the human user. The user may then be prompted to identify one or more cameras that are associated with each of the critical areas.

Once the use factor is identified, the user may be prompted via one or more questions presented on the user interface to enter or otherwise identify one or more triggering functions (triggers) associated with the criticality of each area. In the case of a school, the normal time of arrival of school buses delivering children to the school may be the trigger that requires video monitoring of a school bus drop-off area by security personnel. In the case of an emergency room of a hospital, the arrival of an ambulance or private automobile at an outside entrance to the emergency room may be the trigger for monitoring the emergency room. In this particular case the user may identify the trigger by selecting a switch or motion detector may detects the arrival of an ambulance or private car in a driveway adjacent the emergency room.

During use, the selected use factor and triggering function may be used to preferentially display video from one or more of the critical areas to a human guard on the user interface. In this regard, a display processor may periodically (or upon detecting an event) retrieve the trigger for each corresponding critical area and determine if the trigger condition has been met. If so, then the processor may display associated video in a preferential location on the screen of the user interface. Pre-existing video on the screen may be pushed outwards to the periphery or simply overwritten.

Preferential displaying in this context means that the video is depicted in a prominent manner (e.g., in the center of the screen and in a relative large window). The preferential display of the critical areas occurs automatically based upon the triggering function without any further input from the user.

In general, CCTV and video surveillance installations may have 100s of cameras and a dedicated control rooms used to monitor them. The camera count, number of CCTV operators and workstations/monitors will vary depending on the size of the installation/site. Video surveillance is typically needed at airports, hospitals, schools, health care institutions, power plants, casinos/gaming parlors, production plants, warehouses, banking/finance sites, retail/commercial sites, corporate sites, government sites (Homeland Security, Law Enforcement), public sector sites, travel and transit sites, manufacturing sites, entertainment sites, media and leisure sites, utility sites, etc.

In many applications, camera views displayed on monitors may be loaded on an individual basis and/or along with a set of salvo videos (group of cameras) on an as-needed basis. Additional cameras may be loaded as the user feels the need. Generally, if the site has 500+ cameras, then all 500+ cameras will not be monitored constantly, but on an as-needed basis following some detected event (e.g., alarms, incidents, etc.).

Many currently available video surveillance systems and integrated security systems have a number of significant limitations on coverage. For example, no system intelligence is typically provided for purposes of proactively monitoring camera views, such as when to monitor what cameras. However, monitoring needs and the criticality of some camera views keep changing throughout the day and system intelligence has not been provided within existing systems for accommodating these changes. For example, a school may have a number of locations where monitoring is critical. In the morning, school entry point cameras need to be monitored. Similarly, school buses should be monitored at bus discharge locations. Similarly, during lunch time a cafeteria and/or food court should be monitored and in the evening, exit doors and school bus loading and departure locations should be monitored.

Airports have similar critical areas. For example in an airport terminal, gates adjacent to where aircraft takeoff, taxi and land should be monitored for activity. Similarly, check-in areas should be monitored when large numbers of people arrive or a crowd is detected.

Hospitals must also be monitored in critical areas. For example, in the case of an emergency room of a hospital, once an ambulance reaches the hospital, then ambulance area cameras should be loaded.

Casinos/Gaming sites have similar needs. For example, the appropriate camera(s) may need to be monitored whenever a jackpot is won by the user on any of the slot machines or any of the other casino games, etc. In any of these examples, monitoring needs may change from site to site based on the organization involved and where that surveillance system is deployed (e.g., schools, hospitals, casinos, airports, etc.).

Some prior systems have allowed views and salvos to be created to group at least some of these cameras. However, there is no intelligence for detecting changing conditions based on need and, as a consequence, the user/operator can still miss the need to monitor some cameras when needed. Such systems may be provided with some minimum level of video analytics, but these analytics have been limited to camera level detection and do not provide data, such as "when to monitor what." As such, there is a need for increased intelligence in surveillance systems to inform the operator or to automatically load cameras based on changes in the monitored areas and sites in order to increase the overall situational awareness.

In general, the solution shown in FIG. 1 operates by dynamically presenting critical camera views to operator's workstation/monitors that are important and activity intensive at any given point of time and that keeps updating the views throughout the day by constantly anticipating and/or sensing the activities happening at the site. Activities at the premises/site may be calculated based upon user inputs/ human inputs and the security system's historic data (big data)/machine inputs.

Figure 2:
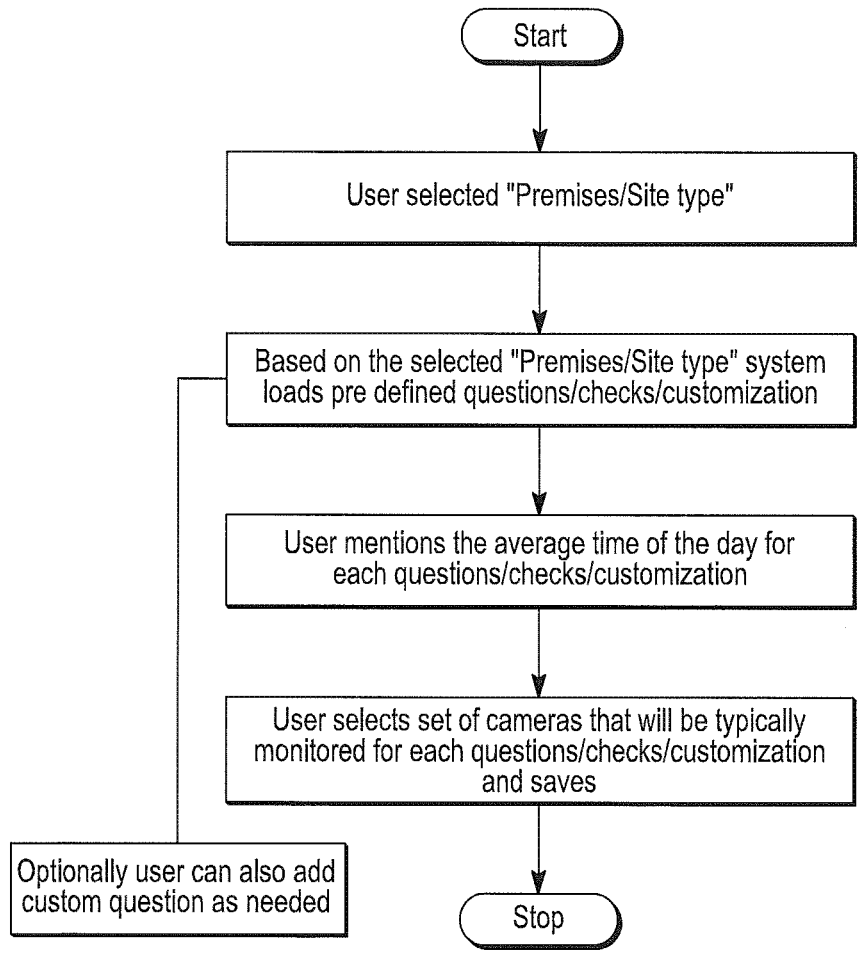
FIG. 2 is a flow chart of steps that may be used by the system of FIG. 1.
Figure 3:
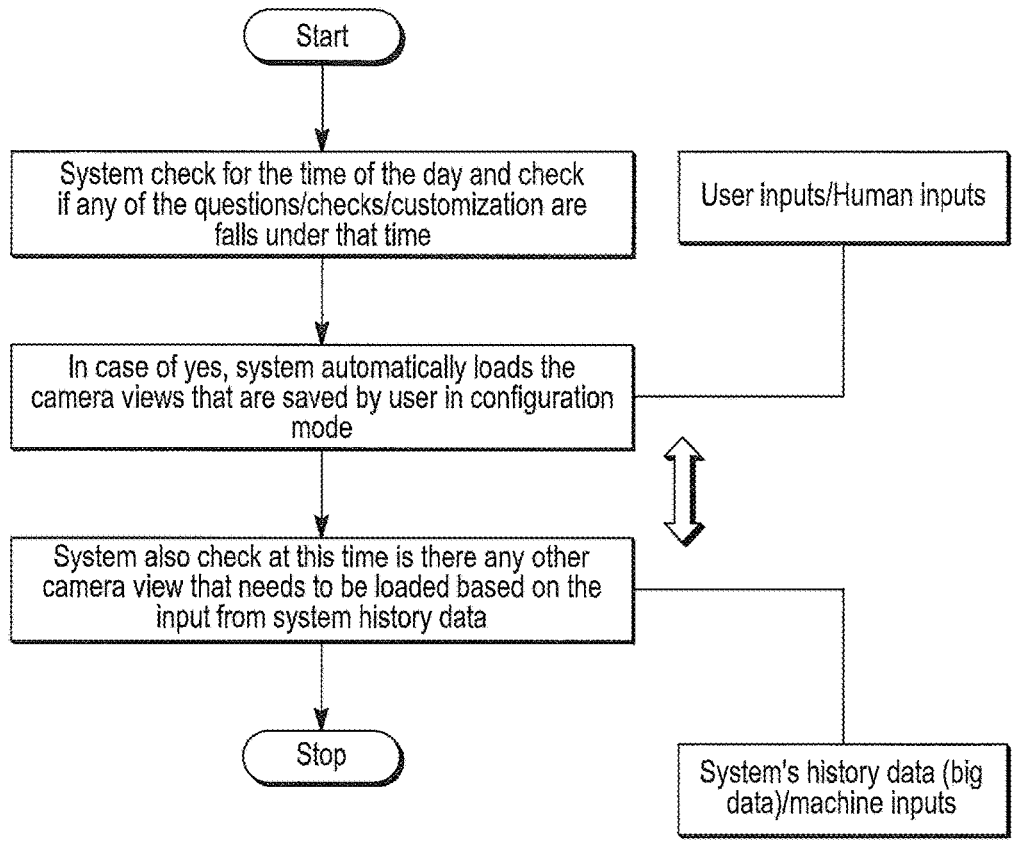
FIG. 3 is a flow chart of additional steps that may be used by the system of FIG. 1.

User inputs/human inputs are received by the system to facilitate the automatic viewing of critical locations based upon processes shown generally in FIGS. 2 and 3. User/ human inputs may be used mainly to train and program/ configure the system and to find the "critical, important and activity intensive cameras" across the site at any given point of time. User/Human inputs are used to provide details on the nature of the premises/site and monitoring needs. There inputs are used to identify typical activities that are happening in the site throughout the day (when and where). Custom inputs may also be received.

The system's historic data (big data)/Machine Inputs may also be used as triggers. For example, alarm/event and co-relation data (e.g., so and so camera has been found to generate more alarms over some period of time) may be used to trigger surveillance. Similarly, live camera monitoring performed by one or more processors of the system may be used for detecting trends of activity by a user (e.g., cameras frequently monitored by the operator either alone or at around so and so time). Alternatively, cameras that get more playback requests of previously recorded video may be used as a source for identifying critical areas and for providing triggers.

In general, any of a number of different types of premises/ sites may be configurable by the user during commissioning of the surveillance system. For example, the user can select one of a number of different use factors that define a premises type, such as "Hospital" or "School" or "Airport" or "Casinos/Gaming" or "Banking/Finance" or "Retail/ Commercial, Corporate, Government (Homeland Security, Law Enforcement), etc.

Turning now to user inputs/human inputs, a more specific example may be provided. For example, during commissioning, the user may be presented with a list of use factors (as shown in FIG. 2) and may select as a premises/site type the word "school." The system may accept the word school and retrieve identifiers of a set of critical areas normally present within a school and at least some corresponding information needed to monitor the critical areas of a school. Other information needed to monitor the critical areas may be obtained from the user by presenting a number of questions through the user interface to the user. An appropriate set of questions may be as follows:

| | |
|---|---|
| 1. "What is the average time that school starts" | [6 AM] |
| 2. "What time students and school buses will start coming to the school" | [8 AM to 9 AM] |
| 3. "What is the lunch break time" | [12:30 PM to 1:30 PM] |
| 4. "What time students and school buses will leave the school" | [4 PM] |
| 5. "What is the school closing time", etc . . . | [6 PM] |

The user may enter the time details for the above questions (as shown in brackets).

As another example of user inputs/human inputs, the user may first select as a use factor the premises/site type of airport. A processor of the system may present a set of questions to the user as follows:
1. What are the peak time that more aircrafts are landing?
2. What are the peak times that more aircrafts takeoff?
3. Which gate handles more aircraft and when?
4. What are the peak times for security check?
5. What time is a baggage area most typically crowded in a day?
6. When more aircraft will be taxing in the terminal?

The user may identify cameras associated with each area and the system may use the entered information to create a viewing schedule.

As another example of user inputs/human inputs, the user may select as a use factor the premises/site type of casinos. The system may then present a set of questions as follows.
1. What is the average time that customer/guest will more likely enter the casino?
2. What is the peak day of the week?
3. Which is the easiest game in the casino?
4. What are the games that are mostly used by players in previous years?
5. What are the games that players are willing to bet more money to play?
6. What is the system address where the security system can get the input from slot system once player begins a game?
7. What is the system address of the user input where a game dealer can provide a trigger to the security system, if any one player bets more than some amount of money?
8. What is the system address for receiving notifications of one day or short time period exceptions to monitoring that are added, such in the case where a high value customer is visiting the casino around 3 PM?

Figure 4:
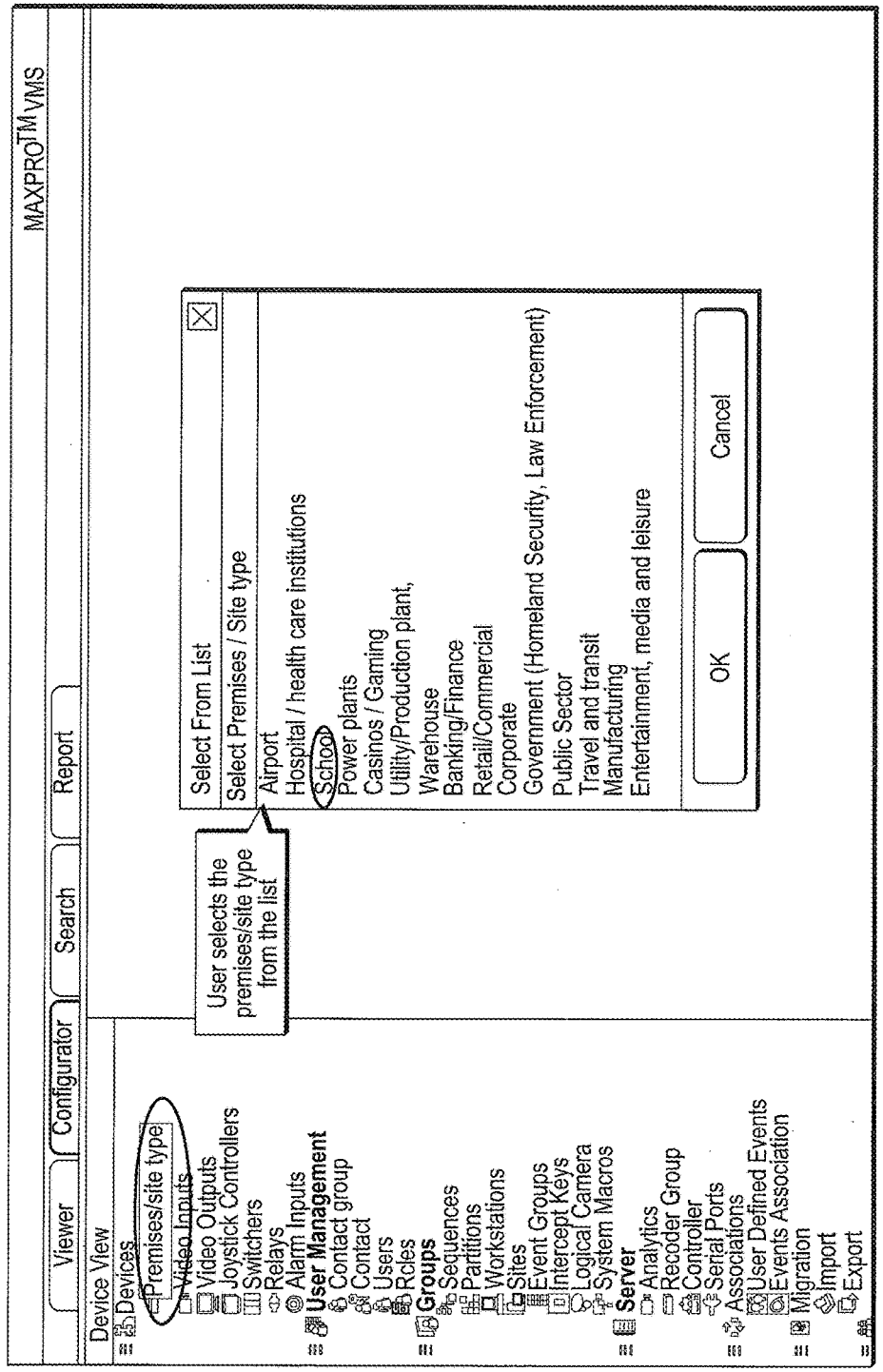
FIG. 4 depicts a screen used by the system of FIG. 1 for selecting a use type.

FIGS. 4-8 illustrate a more detailed example of a school. FIG. 4 illustrates an interactive screen showing a list of possible use types that are selectable by the user. As shown in FIG. 4, the user has selected "school."

Figure 5:
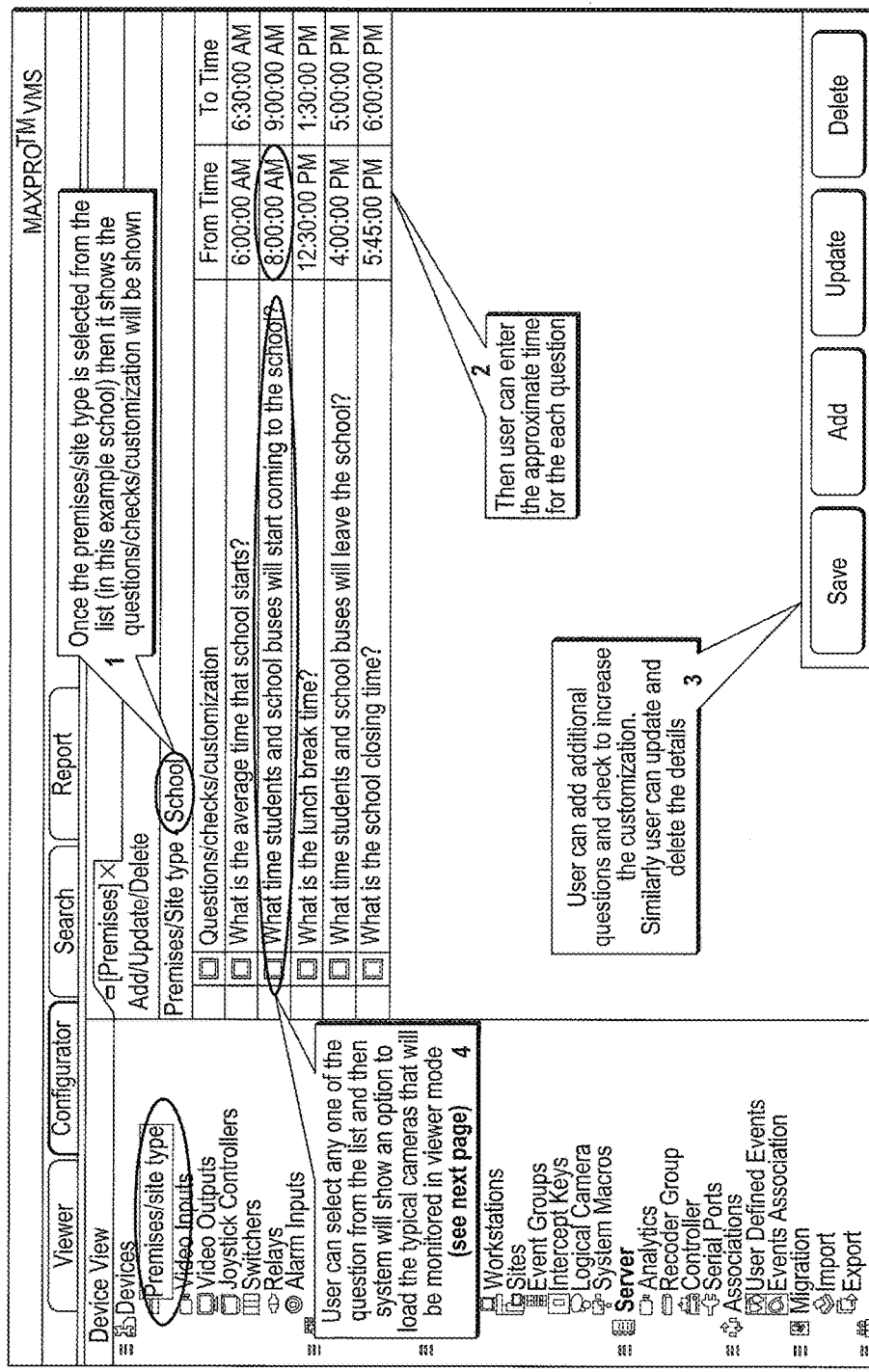
FIG. 5 depicts a screen used by the system of FIG. 1 for presenting questions to a user.

A processor of the system detects the selection of school and retrieve a list of questions from memory as shown in FIG. 5. As shown, the user enters an appropriate set of times in response to each question. The user can also add additional questions and/or update and delete details.

As also shown in FIG. 5, the user can click on any of the questions in order to link a camera to the question. In this case, the question suggests the critical area and allows a user to select the best camera(s) for monitoring that area.

Figure 6:
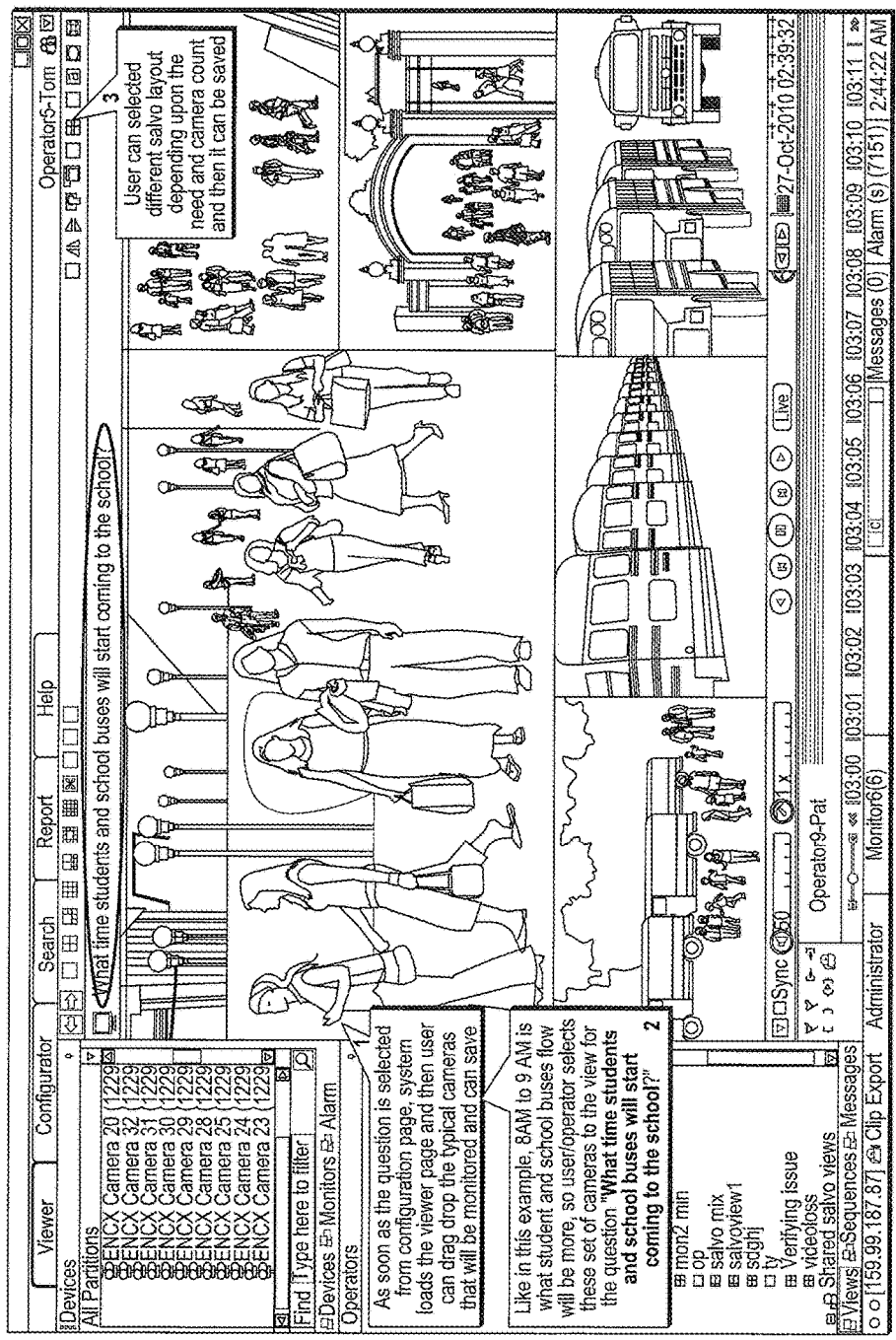
FIG. 6 depicts a surveillance screen used by the system of FIG. 1 for displaying critical areas.

As shown in FIG. 6, as the user clicks on a question, a processor of the system loads a view page (e.g., opens a monitoring display window for viewing video). The question may be repeated at the top of the window as a reminder for the user as the user drags and drops cameras into the window. The user can also select different salvo views in order to address the monitoring needs.

Figure 7:
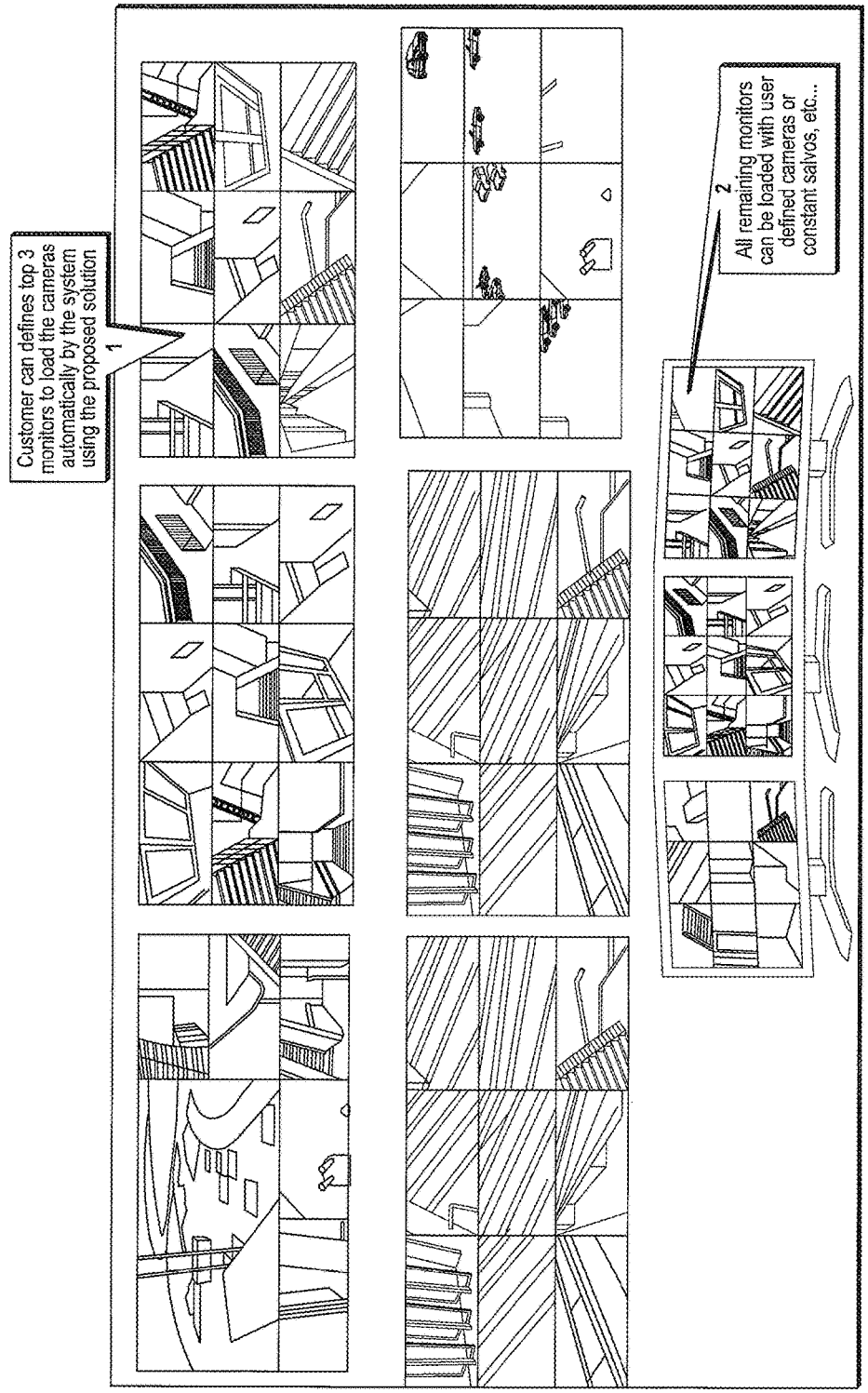
FIG. 7 depicts a monitoring station layout that may be used by the system of FIG. 1.

FIG. 7 shows an exemplary guard station having three rows of cameras. In this case, the critical areas are shown in the top row.

Figure 8:
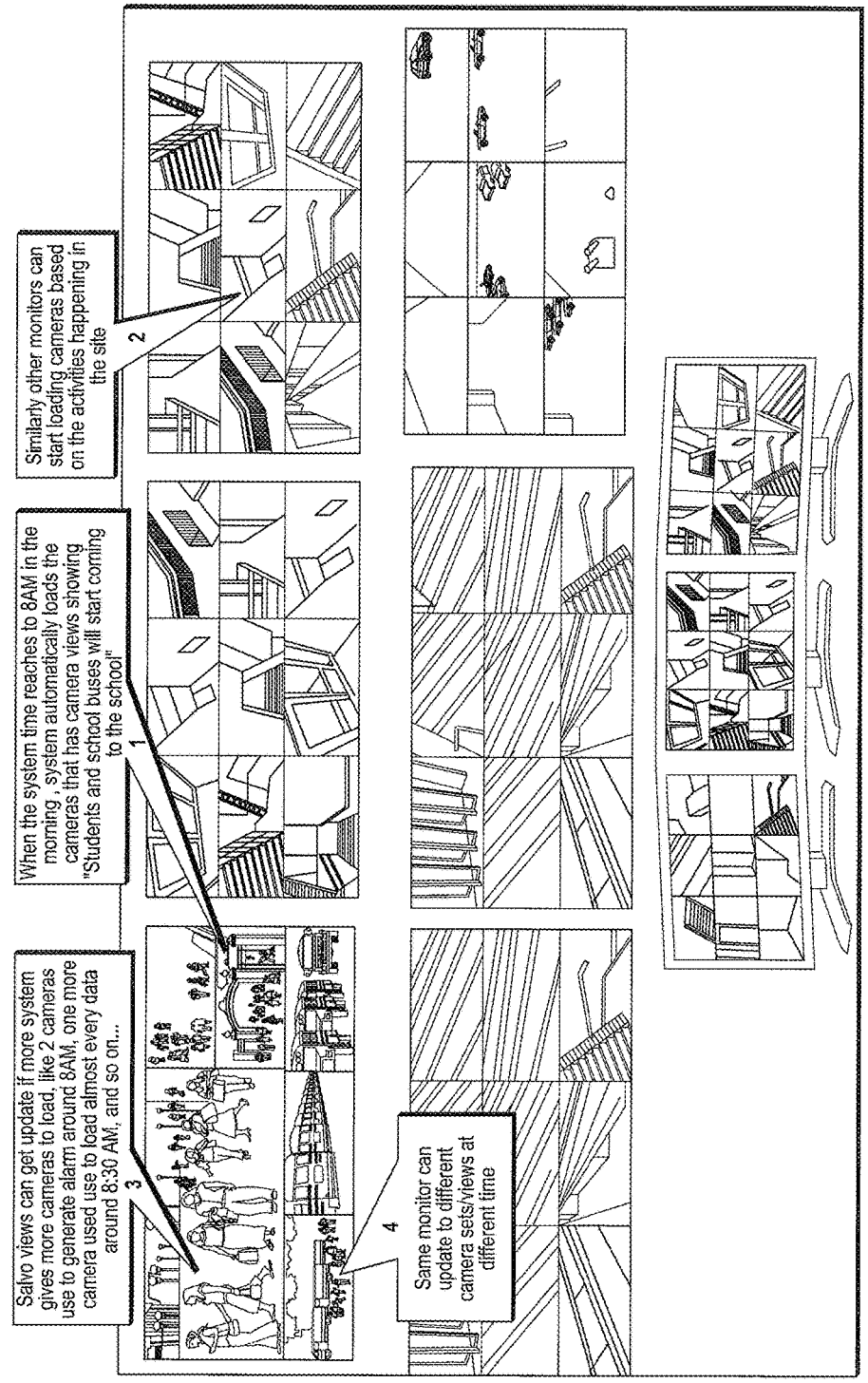
FIG. 8 depicts an alternate monitoring station layout that may be used by the system of FIG. 1.

FIG. 8 illustrates further details of operation of the guard station. As shown in FIG. 8, as the time arrives for viewing a critical area, a processor of the system automatically loads video from the corresponding critical area into the predominant display locations of the guard station.

Other monitors may also begin loading cameras based upon activities occurring at the site. For example, if a security event is detected, one or more of the critical display areas may be overwritten by video from a camera covering the security event. Alternatively, if the event occurs within one of the critical areas, salvo views can be updated with more cameras. For example, if a security event is detected near an entrance to a school at the beginning of the day, then additional camera(s) covering the entrance may be added to a salvo view showing the entrance.

In general, the system includes a plurality of cameras of a surveillance system that detect threats within a secured geographic area, a first file embodied in memory of the surveillance system that defines a plurality of human use scenarios of the secured area, one of the plurality of human user scenarios being selected by a human user, a respective second file corresponding to each of the plurality of human user scenarios embodied in memory of the surveillance system that defines critical surveillance areas of the secured area based upon the selected scenario and at least upon a time of day, the second file receiving from the user an identifier of one or more of the plurality of cameras that correspond to each of the critical surveillance areas and processor of the surveillance system that preferentially displays video from each of the critical surveillance areas based upon the time of day and camera identifiers received from the user.

In other embodiments, the system includes a processor that detects one of the critical areas based upon previous alarms and alarm statistics including one or more of alarm trend and alarm history from the secured area or a camera or other security sensors and the previous alarms further comprise one or more of motion detection, camera sabotage detection, camera blur, video analytics alarms and integration system alarms including access control system, fire detection system intrusion detection system, input or alarm from gaming slot machine in a casino, hospital attendance system data, school attendance system data Input from "Live Flight Information Status" or "Flight Schedule database." Video analytics alarms may include one or more of 1) person entering restricted area; 2) person exited restricted area; 3) person loitering in restricted area; 4) person started moving in wrong direction; 5) person stopped moving in wrong direction; 6) person on fence line; 7) person started running; 8) person stopped running; 9) people converged; 10) people passing by; 11) person trespassing as detected by tripwire; 12) person running in wrong direction; 13) car started moving in wrong direction; 14) car stopped moving in wrong direction; 15) car entered restricted area; 16) car parked in restricted area; 17) car speeding; 18) car made illegal u-turn; 19) car parked in handicapped zone; 20) car pulled off read; 21) car needs assistance; 22) car exited restricted area; 23) car trespassing as detected by tripwire; 24) video signal lost; 25) video signal restored; 26) person counted as entering; 27) person counted as exiting; 28) car entered lost; 29) car exited lot; 30) car counted in lane; 31) object left unattended; 32) object removed; 33) possible theft; 34) entering target zone and 35) staying in target zone.

Alternatively, the system may include a surveillance system that protects a secured geographic area, a plurality of cameras distributed throughout the secured area, a first file embodied in a memory of the surveillance system that defines a plurality of human use scenarios of the secured area, each of the plurality of human user scenarios being selectable by a human user, a respective second file corresponding to each of the plurality of human user scenarios embodied in memory of the surveillance system that defines critical surveillance areas of the secured area based upon the selected scenario and processor of the surveillance system that preferentially displays video from each of the critical surveillance areas based upon a respective human use criteria of each of the critical areas.

Alternatively, the system may include a surveillance system that protects a secured geographic area, a plurality of cameras distributed throughout the secured area, a first file embodied in a memory of the surveillance system that defines a plurality of human use scenarios of the secured area, each of the plurality of human user scenarios being selectable by a human user, a respective second file corresponding to each of the plurality of human user scenarios embodied in memory of the surveillance system that defines critical surveillance areas of the secured area and at least one of the plurality of cameras that covers each of the defined critical surveillance areas based upon a selected scenario of the selectable scenarios and processor of the surveillance system that preferentially displays video from each of the critical surveillance areas based upon a respective human use or non-use criteria of each of the critical areas.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
    a plurality of cameras of a surveillance system that detect threats within a secured area;
    a first file embodied in memory of the surveillance system that defines a plurality of use scenarios of the secured area, one of the plurality of use scenarios being selected as applicable to the secured area;
    a second file corresponding to the one of the plurality of use scenarios embodied in the memory of the surveillance system that defines critical surveillance areas of the secured area based at least upon the one of the plurality of use scenarios and a respective triggering condition for each of the critical surveillance areas, wherein the second file corresponding to the one of the plurality of use scenarios includes a respective identifier of respective ones of the plurality of cameras that correspond to each of the critical surveillance areas;
    a user interface of the surveillance system; and
    a processor of the surveillance system that preferentially displays a respective video stream from each of the respective ones of the plurality of cameras that correspond to a respective one of the critical surveillance areas when the processor determines that the respective triggering condition for the respective one of the critical surveillance areas has been met,
    wherein the processor automatically displays the respective video stream from each of the respective ones of the plurality of cameras that correspond to the respective one of the critical surveillance areas in a respective window of the user interface at a preferential location of the user interface, and
    wherein the processor determines that the respective triggering condition for the respective one of the critical surveillance areas has been met independently of respective content of the respective video stream from each of the respective ones of the plurality of cameras.

2. The system as in claim 1 wherein the processor sets the respective triggering condition for each of the critical surveillance areas based upon previous alarms and alarm statistics for each of the critical surveillance areas.

3. The system as in claim 2 wherein the previous alarms and alarm statistics include one or more of motion detection, camera sabotage detection, camera blur, video analytics alarms, and integration system alarms.

4. The system as in claim 1 wherein the processor defines each of the critical surveillance areas stored in the second file corresponding to the one of the plurality of use scenarios based upon camera selection statistics and trends.

5. The system as in claim 1 wherein the processor defines each of the critical surveillance areas stored in the second file corresponding to the one of the plurality of use scenarios based upon playback frequency of recorded video from the plurality of cameras.

6. The system as in claim 1 wherein the critical surveillance areas include a main entrance and a main exit of a building, and wherein the respective triggering condition for each of the critical surveillance areas includes a time of day corresponding to an opening time and a closing time of the building.

7. The system as in claim 1 wherein the plurality of use scenarios includes at least a school, a hospital, a casino, a bank, an airport, a retail business, a corporate premises, a Homeland Security location, a law enforcement location, a public sector travel and transit location, a manufacturing premises, an entertainment premises, a media and leisure premises, and a utility premises.

8. The system as in claim 1 wherein the user interface displays a respective icon for each of the plurality of use scenarios and receives an input identifying the one of the plurality of use scenarios.

9. The system as in claim 1 wherein the processor displays respective descriptive information associated with the respective video stream from each of the respective ones of the plurality of cameras that correspond to the respective one of the critical surveillance areas based upon the respective triggering condition for each of the critical surveillance areas.

10. The system as in claim 1 wherein a respective size of the respective window displaying the respective video stream from each of the respective ones of the plurality of cameras that correspond to the respective one of the critical surveillance areas is updated dynamically as the processor detects the respective triggering condition for each of the critical surveillance areas.

11. A system comprising:
a surveillance system that protects a secured area;
a plurality of cameras distributed throughout the secured area;
a first file embodied in a memory of the surveillance system that defines a plurality of use scenarios of the secured area, each of the plurality of use scenarios being selectable as applicable to the secured area;
a respective second file corresponding to each of the plurality of use scenarios embodied in the memory of the surveillance system that defines respective critical surveillance areas of the secured area for a corresponding one of the plurality of use scenarios, a respective triggering condition for each of the respective critical surveillance areas, and respective identifiers of respective ones of the plurality of cameras that correspond to each of the respective critical surveillance areas;
a user interface of the surveillance system; and
a processor of the surveillance system that preferentially displays a respective video stream from each of the respective ones of the plurality of cameras that correspond to a respective one of the respective critical surveillance areas when the corresponding one of the plurality of use scenarios is selected as applicable to the secured area,
wherein the processor preferentially displays the respective video stream when the processor determines that the respective triggering condition for the respective one of the respective critical surveillance areas has been met,
wherein the processor automatically displays the respective video stream from each of the respective ones of the plurality of cameras that correspond to the respective one of the respective critical surveillance areas in a respective window of the user interface at a preferential location of the user interface, and
wherein the processor determines that the respective triggering condition for the respective one of the respective critical surveillance areas has been met independently of respective content of the respective video stream from each of the respective ones of the plurality of cameras.

12. The system as in claim 11 wherein the plurality of use scenarios includes at least a school or a hospital.

13. The system as in claim 12 wherein the respective triggering condition includes a time of day.

14. The system as in claim 13 wherein the time of day includes a set of normal operating hours of the school.

15. The system as in claim 11 wherein the respective triggering condition includes a number of people in the respective one of the respective critical surveillance areas exceeding a threshold value.

16. The system as in claim 11 wherein the processor detects the respective one of the respective critical surveillance areas based upon previous alarms.

17. The system as in claim 11 wherein the processor detects the respective one of the respective critical surveillance areas based upon camera selection over some time period by a user.

18. The system as in claim 11 wherein the processor detects the respective one of the respective critical surveillance areas based upon a playback frequency of recorded video from the respective ones of the plurality of cameras.

* * * * *